(12) United States Patent
Ashton et al.

(10) Patent No.: US 11,175,187 B2
(45) Date of Patent: Nov. 16, 2021

(54) AIR TEMPERATURE SENSOR HAVING A BUSHING

(71) Applicant: Unison Industries, LLC, Jacksonville, FL (US)

(72) Inventors: Gregory Lloyd Ashton, South Plymouth, NY (US); Jarodd Dan Goedel, Sherburne, NY (US); John Patrick Parsons, Afton, NY (US)

(73) Assignee: Unison Industries, LLC, Jacksonville, FL (US)

( * ) Notice: Subject to any disclaimer, the term of this patent is extended or adjusted under 35 U.S.C. 154(b) by 422 days.

(21) Appl. No.: 16/055,841

(22) Filed: Aug. 6, 2018

(65) Prior Publication Data
US 2020/0041352 A1     Feb. 6, 2020

(51) Int. Cl.
| G01K 1/14 | (2021.01) |
| G01K 13/02 | (2021.01) |
| G01K 1/08 | (2021.01) |
| F01D 17/08 | (2006.01) |
| G01K 13/024 | (2021.01) |

(52) U.S. Cl.
CPC .............. *G01K 1/14* (2013.01); *G01K 1/08* (2013.01); *G01K 13/02* (2013.01); *G01K 13/028* (2013.01); *F01D 17/085* (2013.01); *F05D 2270/80* (2013.01); *G01K 13/024* (2021.01)

(58) Field of Classification Search
CPC ............ G01K 1/14; G01K 1/08; G01K 13/02; G01K 13/028; G01K 2013/024; F01D 17/085; F05D 2270/80
See application file for complete search history.

(56) References Cited

U.S. PATENT DOCUMENTS

| 4,438,290 A | 3/1984 | Wells |
| 5,348,395 A | 9/1994 | Corr, II et al. |
| 5,653,538 A * | 8/1997 | Phillips .................. G01K 13/02 374/135 |
| 6,272,735 B1 | 8/2001 | Moriwake |
| 6,632,018 B2 | 10/2003 | Isshiki |
| 6,857,776 B2 | 2/2005 | Park |
| 8,033,722 B2 | 10/2011 | Kulkarni |
| 8,662,746 B2 | 3/2014 | Subramanian |

(Continued)

FOREIGN PATENT DOCUMENTS

| EP | 0413198 A1 | 2/1991 |
| EP | 2607871 A2 | 6/2013 |

(Continued)

OTHER PUBLICATIONS

Intellectual Property Office, Combined Search and Examination Report Under Sections 17 and 18(3) re Application No. BG1911172. 3, dated Jan. 29, 2020, 7 pages, South Wales, NP.

*Primary Examiner* — Lisa M Caputo
*Assistant Examiner* — Philip L Cotey
(74) *Attorney, Agent, or Firm* — McGarry Bair PC

(57) ABSTRACT

An air temperature sensor for use on an aircraft can include a housing defining an interior and having a trailing edge, a temperature sensor having a distal end and located within the interior, a support tube surrounding at least a portion the temperature sensor, an element shroud surrounding at least a portion of support tube, and a bushing isolating the trailing edge of the housing from the distal end of temperature sensor.

20 Claims, 5 Drawing Sheets

(56) References Cited

U.S. PATENT DOCUMENTS

| | | | |
|---|---|---|---|
| 9,714,582 B2* | 7/2017 | Alonte | G01K 7/023 |
| 9,733,131 B2 | 8/2017 | Ewing | |
| 9,829,385 B2* | 11/2017 | Kendall | G01K 1/125 |
| 2004/0114664 A1* | 6/2004 | Park | G01K 7/02 |
| | | | 374/179 |
| 2004/0114665 A1 | 6/2004 | Park et al. | |
| 2007/0121701 A1 | 5/2007 | Gennissen et al. | |
| 2011/0226044 A1* | 9/2011 | Hughes | G01N 3/42 |
| | | | 73/54.02 |
| 2013/0167554 A1* | 7/2013 | Parsons | G01K 1/12 |
| | | | 60/803 |
| 2015/0068281 A1 | 3/2015 | Lyon et al. | |
| 2015/0337678 A1* | 11/2015 | Alonte | F01D 17/085 |
| | | | 415/118 |
| 2018/0372556 A1 | 12/2018 | Parsons et al. | |
| 2018/0372559 A1 | 12/2018 | Parsons et al. | |

FOREIGN PATENT DOCUMENTS

| | | |
|---|---|---|
| EP | 2610599 A2 | 7/2013 |
| GB | 1513469 | 6/1978 |
| JP | H0419486 Y2 | 5/1992 |

\* cited by examiner

AIR TEMPERATURE SENSOR HAVING A BUSHING

BACKGROUND OF THE INVENTION

Turbine engines, and particularly gas or combustion turbine engines, are rotary engines that extract energy from a flow of combusted gases passing through the engine onto a multitude of rotating turbine blades. Gas turbine engines have been used for land and nautical locomotion and power generation, but are most commonly used for aeronautical applications such as airplanes or helicopters. In airplanes, gas turbine engines are used for propulsion of the aircraft.

During operation of a turbine engine, the total air temperature also known as stagnation temperature can be measured by a specially designed temperature probe mounted on the surface of the aircraft or the interior walls of the turbine engine. The probe is designed to reduce the velocity of air in the flow stream. The air experiences an adiabatic increase in temperature as it is brought to rest and measured, and the total air temperature is therefore higher than the static air temperature. Total air temperature is an essential input for calculating static air temperature and true airspeed. Total air temperature sensors can be exposed to adverse conditions including high Mach numbers and icing conditions, as well as water and debris, which may affect the reading provided by the sensor.

BRIEF DESCRIPTION OF THE INVENTION

In one aspect, the disclosure relates to an air temperature sensor for use on an aircraft, the air temperature sensor including a housing defining an interior and having a trailing edge, a temperature sensor having a distal end and located within the interior, a support tube surrounding at least a portion the temperature sensor, an element shroud surrounding at least a portion of support tube and a bushing isolating the trailing edge of the housing from the distal end of temperature sensor.

In another aspect, the disclosure relates to an aircraft turbine engine, including a core having a compressor, combustor, and turbine sections in axial flow arrangement mounted in a casing, a housing defining an interior and having a trailing edge, a temperature sensor having a distal end and located within the interior, a support tube surrounding at least a portion the temperature sensor, an element shroud surrounding at least a portion of support tube, and a bushing isolating the trailing edge of the housing from the distal end of temperature sensor.

In yet another aspect, the disclosure relates to a method of thermally isolating and centering a temperature sensor having a distal end in a support tube and a shroud element in an aircraft turbine engine, the method including press fitting a bushing having an aperture and an outer wall between the element shroud and the support tube, wherein the support tube is press fit into the aperture of the bushing and the outer wall of the bushing is press fit into a distal end of the element shroud.

DESCRIPTION OF EMBODIMENTS OF THE INVENTION

Figure 1:
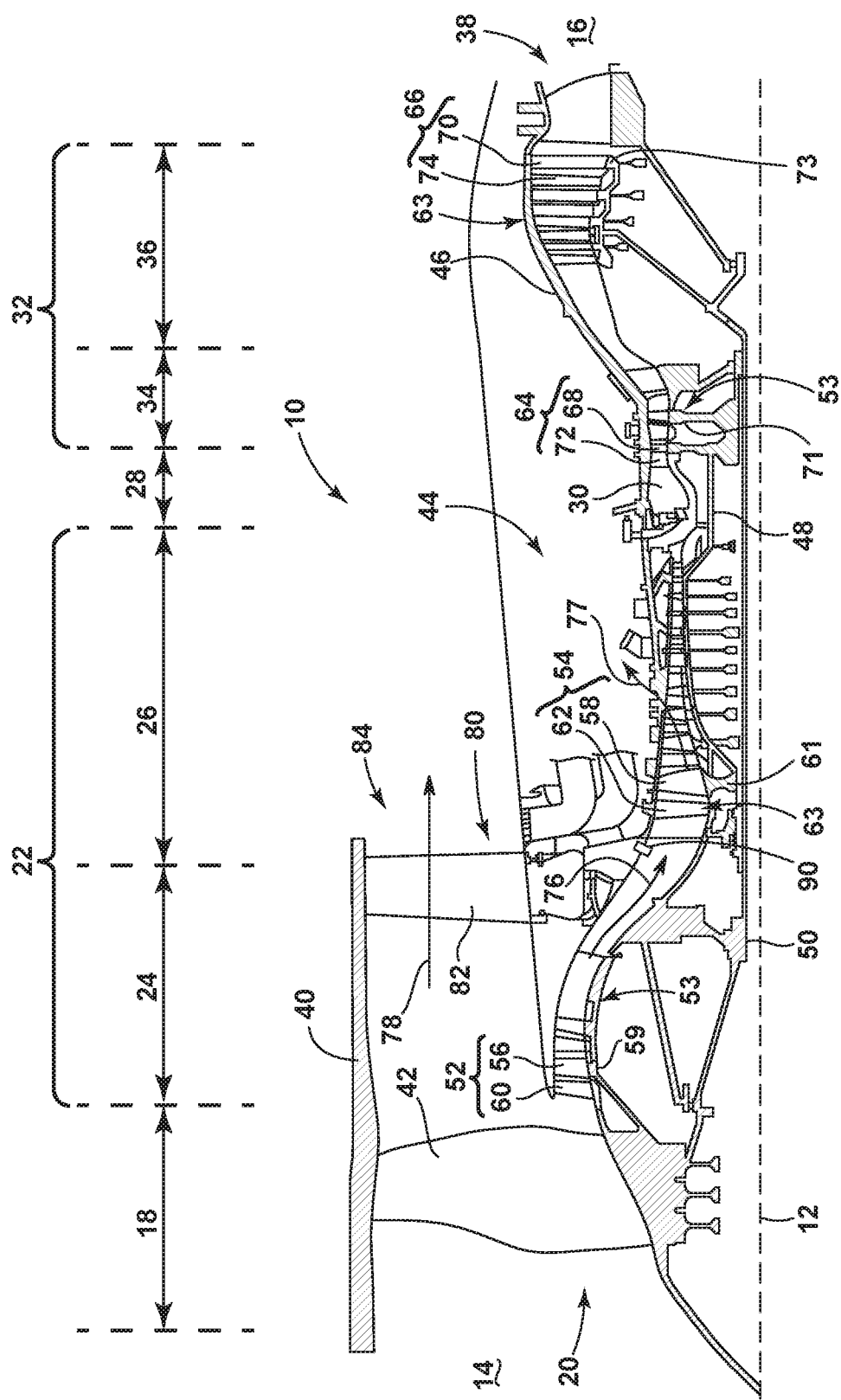
FIG. 1 is a schematic cross-sectional diagram of a turbine engine for an aircraft with an air temperature sensor.

The described embodiments of the present disclosure are directed to an air temperature sensor for an aircraft turbine engine. It will be understood, however, that the disclosure is not so limited and may have general applicability within an engine, as well as in non-aircraft applications, such as other mobile applications and non-mobile industrial, commercial, and residential applications.

As used herein, the term "forward" or "upstream" refers to moving in a direction toward the engine inlet, or a component being relatively closer to the engine inlet as compared to another component. The term "aft" or "downstream" used in conjunction with "forward" or "upstream" refers to a direction toward the rear or outlet of the engine or being relatively closer to the engine outlet as compared to another component.

Additionally, as used herein, the terms "radial" or "radially" refer to a dimension extending between a center longitudinal axis of the engine and an outer engine circumference. A "set" as used herein can include any number of a particular element, including only one.

All directional references (e.g., radial, axial, proximal, distal, upper, lower, upward, downward, left, right, lateral, front, back, top, bottom, above, below, vertical, horizontal, clockwise, counterclockwise, upstream, downstream, forward, aft, etc.) are only used for identification purposes to aid the reader's understanding of the present disclosure, and do not create limitations, particularly as to the position, orientation, or use of the disclosure. Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to one another. The exemplary drawings are for purposes of illustration only and the dimensions, positions, order, and relative sizes reflected in the drawings attached hereto can vary.

FIG. 1 is a schematic cross-sectional diagram of a gas turbine engine 10 for an aircraft. The engine 10 has a generally longitudinally extending axis or centerline 12 extending forward 14 to aft 16. The engine 10 includes, in downstream serial flow relationship, a fan section 18 including a fan 20, a compressor section 22 including a booster or low pressure (LP) compressor 24 and a high pressure (HP) compressor 26, a combustion section 28 including a combustor 30, a turbine section 32 including a HP turbine 34, and a LP turbine 36, and an exhaust section 38.

The fan section 18 includes a fan casing 40 surrounding the fan 20. The fan 20 includes a plurality of fan blades 42 disposed radially about the centerline 12. The HP compressor 26, the combustor 30, and the HP turbine 34 form a core 44 of the engine 10, which generates combustion gases. The core 44 is surrounded by core casing 46, which can be coupled with the fan casing 40. An air temperature sensor 90, also referred to as a total air temperature (TAT) sensor 90 can be disposed in the fan casing 40 as shown; however, this example is not meant to be limiting and the air temperature sensor 90 may be positioned in other locations in the turbine engine 10.

A HP shaft or spool 48 disposed coaxially about the centerline 12 of the engine 10 drivingly connects the HP turbine 34 to the HP compressor 26. A LP shaft or spool 50, which is disposed coaxially about the centerline 12 of the engine 10 within the larger diameter annular HP spool 48, drivingly connects the LP turbine 36 to the LP compressor 24 and fan 20. The spools 48, 50 are rotatable about the engine centerline and couple to a plurality of rotatable elements, which can collectively define a rotor 51.

The LP compressor 24 and the HP compressor 26 respectively include a plurality of compressor stages 52, 54, in which a set of compressor blades 56, 58 rotate relative to a corresponding set of static compressor vanes 60, 62 (also called a nozzle) to compress or pressurize the stream of fluid passing through the stage. In a single compressor stage 52, 54, multiple compressor blades 56, 58 can be provided in a ring and can extend radially outwardly relative to the centerline 12, from a blade platform to a blade tip, while the corresponding static compressor vanes 60, 62 are positioned upstream of and adjacent to the rotating blades 56, 58. It is noted that the number of blades, vanes, and compressor stages shown in FIG. 1 were selected for illustrative purposes only, and that other numbers are possible.

The blades 56, 58 for a stage of the compressor can be mounted to a disk 61, which is mounted to the corresponding one of the HP and LP spools 48, 50, with each stage having its own disk 61. The vanes 60, 62 for a stage of the compressor can be mounted to the core casing 46 in a circumferential arrangement.

The HP turbine 34 and the LP turbine 36 respectively include a plurality of turbine stages 64, 66, in which a set of turbine blades 68, 70 are rotated relative to a corresponding set of static turbine vanes 72, 74 (also called a nozzle) to extract energy from the stream of fluid passing through the stage. In a single turbine stage 64, 66, multiple turbine blades 68, 70 can be provided in a ring and can extend radially outwardly relative to the centerline 12 while the corresponding static turbine vanes 72, 74 are positioned upstream of and adjacent to the rotating blades 68, 70. It is noted that the number of blades, vanes, and turbine stages shown in FIG. 1 were selected for illustrative purposes only, and that other numbers are possible.

The blades 68, 70 for a stage of the turbine can be mounted to a disk 71, which is mounted to the corresponding one of the HP and LP spools 48, 50, with each stage having a dedicated disk 71. The vanes 72, 74 for a stage of the compressor can be mounted to the core casing 46 in a circumferential arrangement.

Complementary to the rotor portion, the stationary portions of the engine 10, such as the static vanes 60, 62, 72, 74 among the compressor and turbine section 22, 32 are also referred to individually or collectively as a stator 63. As such, the stator 63 can refer to the combination of non-rotating elements throughout the engine 10.

In operation, the airflow exiting the fan section 18 is split such that a portion of the airflow is channeled into the LP compressor 24, which then supplies pressurized air 76 to the HP compressor 26, which further pressurizes the air. The pressurized air 76 from the HP compressor 26 is mixed with fuel in the combustor 30 and ignited, thereby generating combustion gases. Some work is extracted from these gases by the HP turbine 34, which drives the HP compressor 26. The combustion gases are discharged into the LP turbine 36, which extracts additional work to drive the LP compressor 24, and the exhaust gas is ultimately discharged from the engine 10 via the exhaust section 38. The driving of the LP turbine 36 drives the LP spool 50 to rotate the fan 20 and the LP compressor 24.

A portion of the pressurized airflow 76 can be drawn from the compressor section 22 as bleed air 77. The bleed air 77 can be drawn from the pressurized airflow 76 and provided to engine components requiring cooling. The temperature of pressurized airflow 76 entering the combustor 30 is significantly increased. As such, cooling provided by the bleed air 77 is necessary for operating of such engine components in the heightened temperature environments.

A remaining portion of the airflow 78 bypasses the LP compressor 24 and engine core 44 and exits the engine assembly 10 through a stationary vane row, and more particularly an outlet guide vane assembly 80, comprising a plurality of airfoil guide vanes 82, at the fan exhaust side 84. More specifically, a circumferential row of radially extending airfoil guide vanes 82 are utilized adjacent the fan section 18 to exert some directional control of the airflow 78.

Some of the air supplied by the fan 20 can bypass the engine core 44 and be used for cooling of portions, especially hot portions, of the engine 10, and/or used to cool or power other aspects of the aircraft. In the context of a turbine engine, the hot portions of the engine are normally downstream of the combustor 30, especially the turbine section 32, with the HP turbine 34 being the hottest portion as it is directly downstream of the combustion section 28. Other sources of cooling fluid can be, but are not limited to, fluid discharged from the LP compressor 24 or the HP compressor 26.

Figure 2:
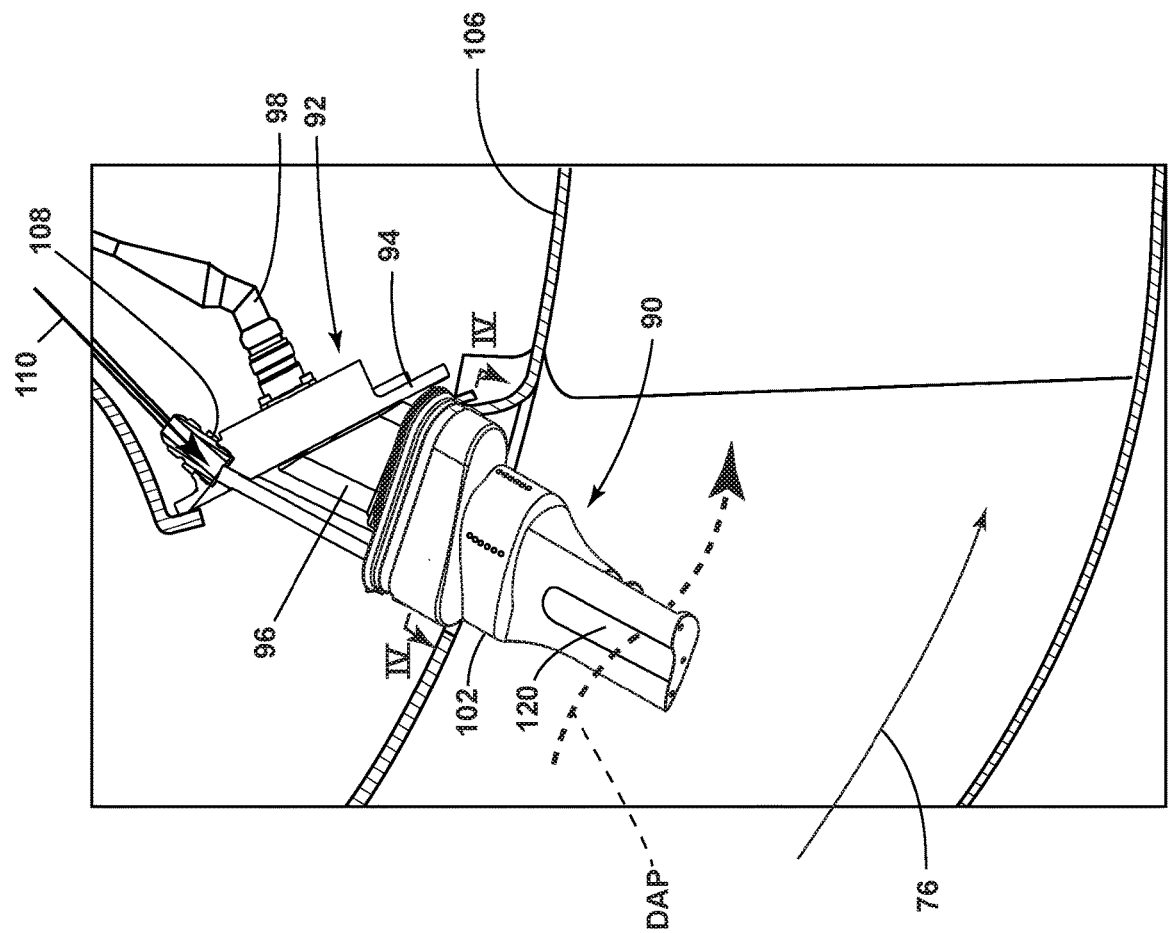
FIG. 2 is an enlarged isometric view of the air temperature sensor in a partially cut-away portion of the engine of FIG. 1

FIG. 2 more clearly depicts the air temperature sensor 90 in a cut away portion of the engine 10. A mounting section 92 having a suitable mounting portion 94 can be included in the air temperature sensor 90. A wiring housing 96 can be included in the mounting section 92 and can be coupled to an electrical conduit 98. The mounting section 92 can be any suitable mounting portion 94 and is not meant to be limiting. A housing 102 is mounted at an upper section 104 of the housing 102 to a portion of the aircraft engine 10 at the mounting section 92. A tube inlet 108 couples to the housing 102 and is coupled to a source of hot bleed air. By way of non-limiting example bleed air 110 is illustrated as entering the tube inlet 108. A temperature sensor inlet 120 can provide a diverted airflow path (DAP) for a portion of the pressurized airflow 76.

Figure 3:
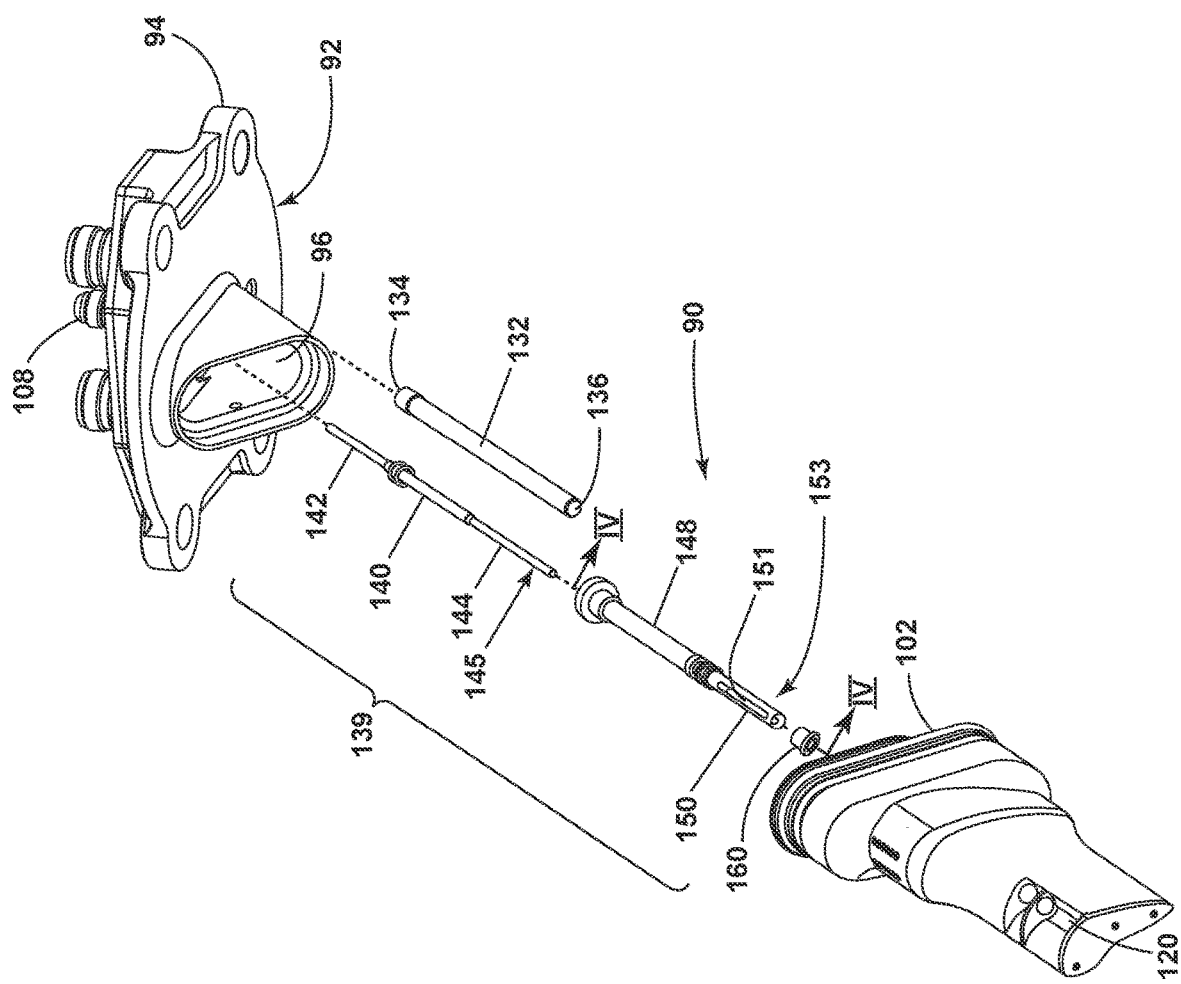
FIG. 3 is an exploded view of the air temperature sensor of FIG. 2.

Turning to FIG. 3, an exploded view of the air temperature sensor 90 is illustrated. A tube, by way of non-limiting example a piccolo tube 132 can extend from a first end 134 to a second end 136. The first end 134 can be coupled to the tube inlet 108 and the second end 136 can extend into the housing 102.

A temperature sensor assembly 139 can include a potting 140, protective sleeving 142, and a temperature sensor 144. The temperature sensor 144 can have a distal end 145. In some embodiments the distal end 145 can have an axial alignment spacer (not shown) for aligning the distal end 145 within the temperature sensor assembly 139. The temperature sensor 144 is a total air temperature sensor suitable for use on an aircraft, within the engine 10.

The temperature sensor assembly 139 can further include a retaining shaft 148, or housing, defining an interior and having an element shroud 150 extending therefrom, the retaining shaft in thermal communication with the engine core 44. The element shroud 150 can have a distal end 153 adjacent the distal end 145 of the temperature sensor 144 when assembled. The retaining shaft 148 can be located within the housing 102. A support tube 152 (FIG. 4) can be provided within the element shroud 150. The element shroud 150 can include a slot opening 151 through which diverted air along the diverted airflow path (DAP) can contact the temperature sensor 144. A bushing 160 can couple to the element shroud 150.

Figure 4:
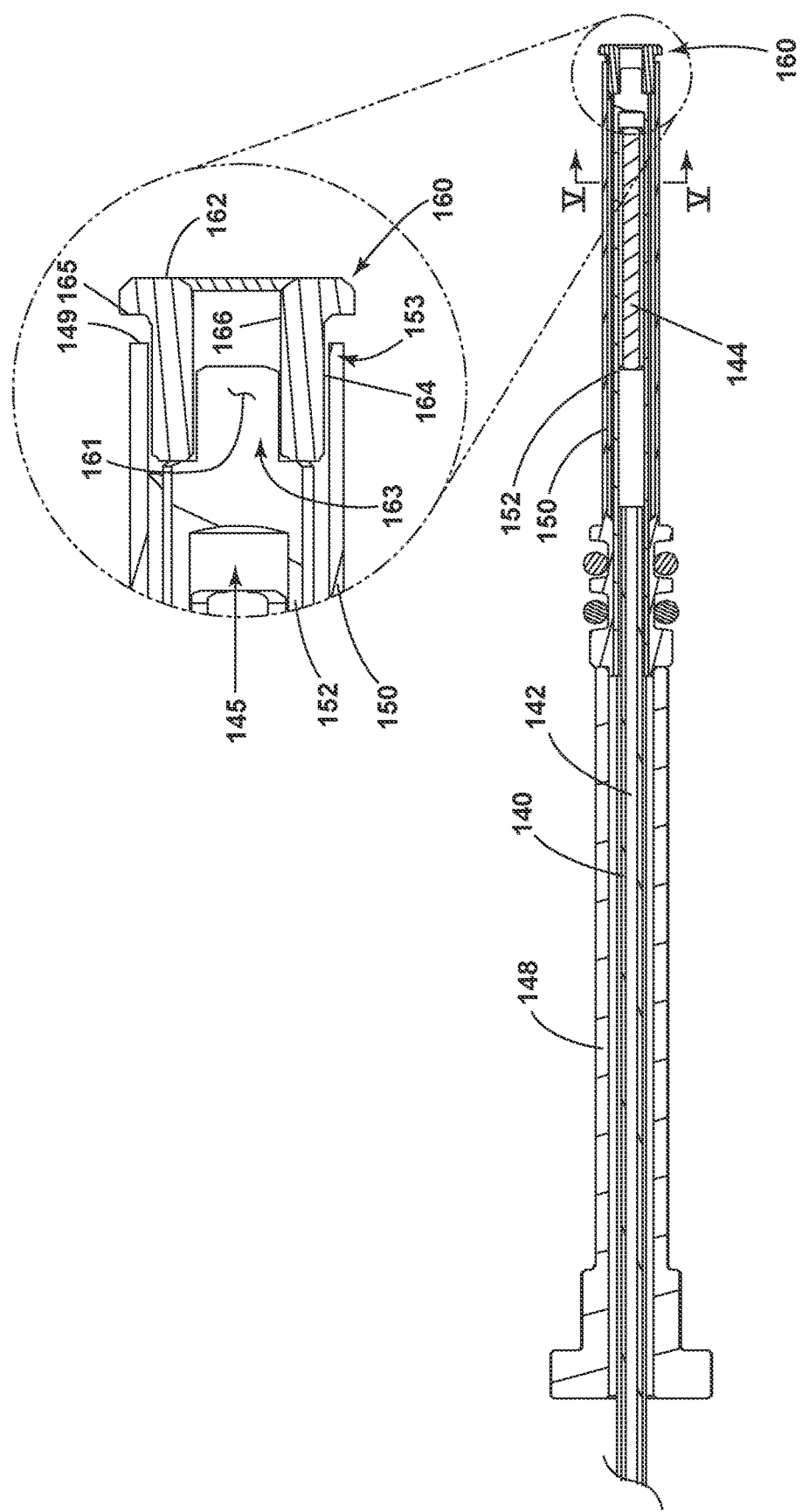
FIG. 4 is a cross-sectional view of the air temperature sensor taken along line IV-IV of FIG. 2.

More specifically, when assembled, as in FIG. 4, the retaining shaft 148 of the temperature sensor assembly 139 encompasses the protective sleeving 142 and potting 140 of the temperature sensor 144. The element shroud 150 encompasses at least a portion of the support tube 152, while the support tube 152 surrounds at least a portion of the temperature sensor 144. The bushing 160 is received by the element shroud 150 at the distal end 153.

The bushing 160 can include an annular outer wall 164 and an inner wall 166. The outer wall 164 can be adjacent the element shroud 150 and the inner wall 166 can be adjacent a distal end 163 of the support tube 152. An aperture 161 in the bushing 160 can extend along the length of the bushing 160 and can stop at an end wall 162. A lip 165, which can be in the form of a flange, can extend from the end wall 162, past the outer wall 164. The lip 165 can act as a stop for the distal end 153 of the element shroud 150.

The bushing 160 is provided to isolate the distal end 145 of the temperature sensor 144 from the element shroud 150. The bushing 160 can be press-fit between the element shroud 150 and the support tube 152 such that the bushing 160 holds the support tube 152 and the element shroud 150 in a fixed relationship relative to one another. For example, the distal end 163 of the support tube 152 can have a smaller diameter than the aperture 161 such that the support tube 152 can be press-fit into the aperture 161 and centered in the element shroud 150. Furthermore, the distal end 145 of the temperature sensor 144 can be spaced from the end wall 162 of the bushing 160.

Figure 5:
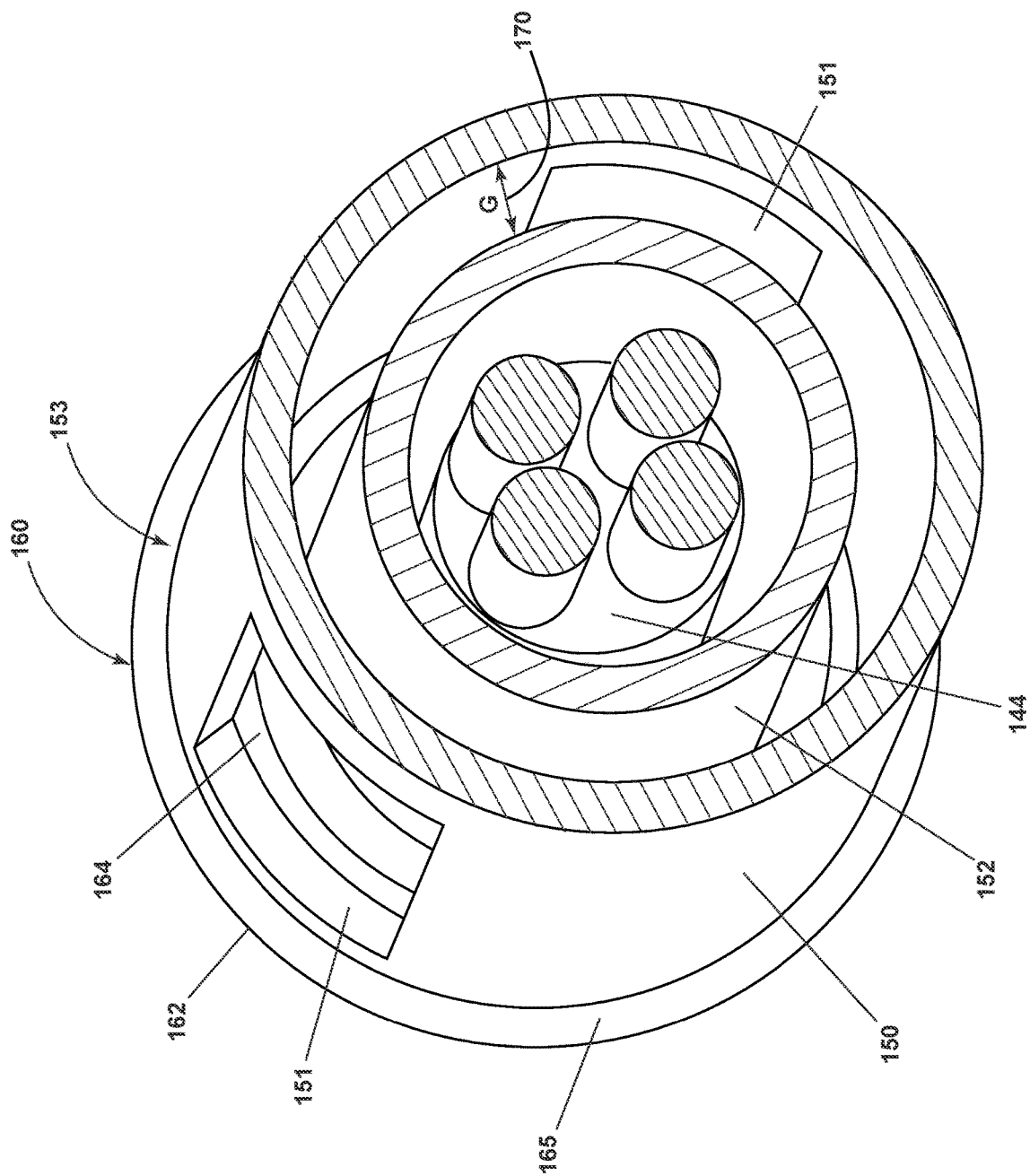
FIG. 5 is a cross-sectional view of the air temperature sensor taken along line V-V of FIG. 4.

FIG. 5 is a cross-sectional view of the air temperature sensor assembly 139 taken along line V-V of FIG. 4, more clearly illustrating the support tube 152 centered in the element shroud 150 due to the bushing 160. Since the support tube 152 has a smaller diameter than the element shroud 150, a uniform gap 170 between the support tube 152 and the element shroud 150 is formed when the temperature assembly 139 is assembled. The gap 170 can provide for thermal isolation between the temperature sensor 144 and the element shroud 150.

A method of thermally isolating and centering a temperature sensor 144 having a distal end 145 in a support tube 152 and a shroud element 150 in an aircraft turbine engine can include press fitting a bushing 160 having an aperture 161 and an outer wall 164 between the element shroud 150 and the support tube 152, wherein the support tube 152 is press fit into the aperture 161 of the bushing 160 and the outer wall 164 of the bushing 160 is press fit into a distal end of the element shroud 150.

Benefits associated with the disclosure discussed herein include isolating a temperature sensor element from a heated metal sensor housing for improved sensor performance and accuracy. Further, benefits can include providing positive mechanical support for improved element durability which can provide consistent temperature readings in an operating temperature range of about −73 to 260 degrees Celsius (−100 to 500 degrees Fahrenheit).

It should be understood that application of the disclosed design is not limited to turbine engines with fan and booster sections, but is applicable to turbojets and turbo engines as well.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An air temperature sensor assembly, the air temperature sensor assembly comprising:
a temperature sensor having a first distal end;
a support tube surrounding the first distal end;
an element shroud having a second distal end and surrounding at least a portion of the support tube; and
a bushing spaced from the first distal end of the temperature sensor, comprising an annular wall defining an aperture, and coupled to the second distal end of the element shroud to thermally isolate the first distal end of the temperature sensor from the element shroud;
wherein the support tube is received in the aperture to center the support tube within the element shroud.

2. The air temperature sensor assembly of claim 1 wherein the bushing is press fit between the element shroud and the support tube.

3. The air temperature sensor assembly of claim 1 wherein the aperture extends through a length of the bushing.

4. The air temperature sensor assembly of claim 3 wherein the support tube is press fit into the aperture of the bushing.

5. The air temperature sensor assembly of claim 4 wherein the aperture stops at an end wall of the bushing.

6. The air temperature sensor assembly of claim 5 wherein an outer wall of the bushing is press fit into the second distal end of the element shroud.

7. The air temperature sensor assembly of claim 6 wherein the bushing further comprises a lip for acting as a stop for element shroud.

8. The air temperature sensor assembly of claim 1 wherein the bushing holds the support tube and element shroud in fixed relationship relative to one another.

9. The air temperature sensor assembly of claim 8 further comprising a gap between the support tube and element shroud.

10. The air temperature sensor assembly of claim 9 wherein the gap is uniform about a circumference of the support tube.

11. The air temperature sensor assembly of claim 1 wherein the element shroud further comprises at least one slot for allowing air flow to contact the temperature sensor.

12. An aircraft turbine engine, comprising:
a core having a compressor, combustor, and turbine sections in axial flow arrangement mounted in a casing;
a housing defining an interior and located in thermal communication with the core;
a temperature sensor having a first distal end and located within the interior;
a support tube surrounding at least a portion the temperature sensor;
an element shroud surrounding at least a portion of the support tube and terminating in a second distal end; and
a bushing spaced from the first distal end of the temperature sensor, comprising an annular wall defining an aperture and coupled to the second distal end of the element shroud, the bushing thermally isolating the housing from the first distal end of temperature sensor;
wherein the support tube is received in the aperture to center the support tube within the element shroud.

13. The aircraft turbine engine of claim 12 wherein the bushing is press fit between the element shroud and the support tube.

14. The aircraft turbine engine of claim 12 wherein the aperture extends through a length of the bushing.

15. The aircraft turbine engine of claim 14 wherein the support tube is press fit into the aperture of the bushing.

16. The aircraft turbine engine of claim 15 wherein the first distal end of the temperature sensor is spaced from an end wall of the bushing.

17. The aircraft turbine engine of claim 16 wherein an outer wall of the bushing is press fit into the second distal end of the element shroud.

18. The aircraft turbine engine of claim 17 wherein the bushing further comprises a lip for acting as a stop for element shroud.

19. An air temperature sensor assembly, the air temperature sensor assembly comprising:

a temperature sensor having a first distal end;
a shroud having a second distal end and surrounding at least a portion of the temperature sensor;
a support tube located within the shroud, surrounding the first distal end, and terminating in a third distal end; and
a bushing comprising an annular wall terminating in an end wall stopped by the second distal end and spaced from the temperature sensor, the annular wall defining an aperture for receiving the third distal end of the support tube;
wherein the annular wall centers the support tube and separates the second distal end of the element shroud from the third distal end of the support tube to define a gap for thermally isolating the temperature sensor from the element shroud.

20. The air temperature sensor assembly of claim 19 wherein the bushing holds the support tube and element shroud in fixed relationship relative to one another to define a gap between the support tube and element shroud, wherein the gap is uniform about a circumference of the support tube.

* * * * *